Patented Oct. 31, 1944

2,361,720

UNITED STATES PATENT OFFICE 2,361,720

NICKEL ELECTROPLATING BATH

William P. ter Horst, Pompton Plains, N. J., assignor to United States Rubber Company, New York, N. Y., a corporation of New Jersey No Drawing. Application February 21, 1942, Serial No. 431,883

7 Claims. (Cl. 204—49)

This invention relates to improvements in metal plating baths, and more particularly to new organic brightening agents as ingredients for nickel plating baths.

According to the invention, it has been discovered that sulphuric acid conversion products of alkyl-substituted 2-mercapto dihydropyrimidines, and more particularly the sulphuric acid derivatives of 4, 6,6-trialkyl dihydropyrimidines, or their salts, when added to an aqueous acid solution comprising essentially a nickel-group metal material selected from the sulphate or chloride of the metal, brings about a resulting direct outstanding bright electrodeposit therefrom.

The following is given in illustration of the invention.

Example

The new brightening agent is used in the regular Watt's bath containing per gallon about 37 ounces of nickel sulphate, about 8 ounces of nickel chloride, and about 5 ounces of boric acid. A suitable current density is from about 5 to about 75 amperes per square foot. A suitable temperature is from about 110° F. to about 130° F. A suitable pH range is from about 3 to about 5. The amount of the organic brightening agent may range from about 0.5 gram to about 2.0 grams per liter of the plating bath, although larger or smaller amounts may be used if desired. The resulting electro-deposit has good brightness and brilliance, and excellent covering and hiding power.

Outstanding as an organic brightening agent is the product of reaction of sulphuric acid with 2-mercapto-6-methyl-4,6-diethyl dihydropyrimidine. More specifically, this material may be prepared as follows: 300 grams of 2-mercapto-6-methyl-4,6-diethyl dihydropyrimidine are added slowly to 600 cc. of 95% sulphuric acid while the mixture is stirred and cooled so as to maintain the temperature within the range from about 20° C. to about 40° C. This is continued until no more heat is evolved. The solution is then warmed until evolution of sulphur dioxide gas ceases. The mixture is then cooled and there is added to it a suspension of 600 grams of calcium hydroxide in 3 liters of water. This should be enough lime to precipitate all of the free sulphuric acid present as calcium sulphate and to form, what is believed to be, the soluble calcium salt of the sulphonated or sulphated mercapto pyrimidine derivative. The calcium is then removed by addition of sodium carbonate solution to the filtrate until there is no further precipitation of calcium carbonate. The calcium carbonate is removed by filtration, and the filtrate containing, what is believed to be, the sodium salt of the sulphonated or sulphated product is evaporated until it is converted into a crystalline mass of pale yellow to white powder. The material is water-soluble.

Other metal salts may be prepared by treating aqueous solutions of the sodium or calcium salts with salts of the desired metals.

2-mercapto-4,6-diethyl - 6 - methyldihydropyrimidine may be prepared as shown in U. S. Patent No. 2,234,848.

The constitution of the organic brightening agents is not definitely known. As stated heretofore, they are believed to be either sulphonated or sulphated trialkyl mercapto pyrimidine derivatives.

While I have herein disclosed with particularity certain preferred manners of performing my invention, I do not thereby desire or intend to limit myself solely thereto, for example, the precise proportions of the materials utilized may be varied, or other modifications made, as will be understood by those skilled in the art, without departing from the spirit and scope of the invention.

Having thus described my invention, what I claim and desire to protect by Letters Patent is:

1. A nickel electrodeposition bath comprising an aqueous acid solution of a nickel salt selected from the group consisting of nickel chloride, and nickel sulphate, and also containing as a nickel brightening agent a pyrimidine compound selected from the class consisting of the sulphuric acid conversion products of alkyl-substituted 2-mercapto dihydropyrimidines, and their salts, said conversion products resulting from reacting alkyl-substituted 2-mercapto dihydropyrimidines with concentrated sulfuric acid, the reaction being characterized by evolution of sulfur dioxide, and heating the reaction mixture until the evolution of sulfur dioxide has substantially ceased.

2. A nickel electrodeposition bath comprising an equeous acid solution of a nickel salt selected from the group consisting of nickel chloride, and nickel sulphate, and also containing as a nickel brightening agent a pyrimidine compound selected from the class consisting of the sulphuric acid conversion products of 2-mercapto-4, 6,6-trialkyl dihydropyrimidines, said conversion products resulting from reacting 2-mercapto-4, 6,6-trialkyl dihydropyrimidines with concentrated sulfuric acid, the reaction being characterized by evolution of sulfur dioxide, and heating the reaction mixture until the evolution of sulfur dioxide has substantially ceased.

3. A nickel electrodeposition bath comprising an aqueous acid solution of a nickel salt selected from the group consisting of nickel chloride, and nickel sulphate, and also containing as a nickel brightening agent a metal salt of the pyrimidine compound obtained by the action of sulphuric acid on 2-mercapto-4, 6,6-trialkyl dihydropyrimidine, the reaction being characterized by evolution of sulfur dioxide, and heating the reaction mixture until the evolution of sulfur dioxide has substantially ceased.

4. A nickel electrodeposition bath comprising an aqueous acid solution of a nickel salt selected from the group consisting of nickel chloride, and nickel sulphate, and also containing as a nickel brightening agent an alkali-metal salt of the pyrimidine compound obtained by the action of sulphuric acid on 2-mercapto-4, 6,6-trialkyl dihydropyrimidine, the reaction being characterized by evolution of sulfur dioxide, and heating the reaction mixture until the evolution of sulfur dioxide has substantially ceased.

5. A method which comprises depositing nickel films from a nickel plating bath comprising an aqueous acid solution of a nickel salt selected from the group consisting of nickel chloride, and nickel sulphate, and also containing as an organic brightening agent a pyrimidine compound selected from the class consisting of the sulphuric acid conversion products of alkyl-substituted 2-mercapto dihydropyrimidines, and their salts, said conversion products resulting from reacting alkyl-substituted 2-mercapto dihydropyrimidines with concentrated sulfuric acid, the reaction being characterized by evolution of sulfur dioxide, and heating the reaction mixture until the evolution of sulfur dioxide has substantially ceased.

6. A nickel electrodeposition bath comprising an aqueous acid solution of a nickel electrolyte of the class consisting of nickel sulfate and nickel chloride, containing as a nickel brightening agent a pyrimidine compound selected from the class consisting of the sulfuric acid conversion products of 2-mercapto-4, 6,6-trialkyl dihydropyrimidines, and their salts, said conversion products resulting from reacting 2-mercapto-4, 6,6-trialkyl dihydropyrimidines with concentrated sulfuric acid, the reaction being characterized by evolution of sulfur dioxide, and heating the reaction mixture until the evolution of sulfur dioxide has substantially ceased.

7. A nickel electrodeposition bath comprising an aqueous acid solution of a nickel electrolyte of the class consisting of nickel sulfate and nickel chloride, containing as a nickel brightening agent a pyrimidine compound selected from the class consisting of the sulfuric acid conversion products of 2-mercapto-6-methyl-4,6-diethyl dihydropyrimidines, and its metal salts, said conversion products resulting from reacting 2-mercapto-6-methyl - 4,6 - diethyl dihydropyrimidines with concentrated sulfuric acid, the reaction being characterized by evolution of sulfur dioxide, and heating the reaction mixture until the evolution of sulfur dioxide has substantially ceased.

WILLIAM P. ter HORST.